Patented Aug. 30, 1927.

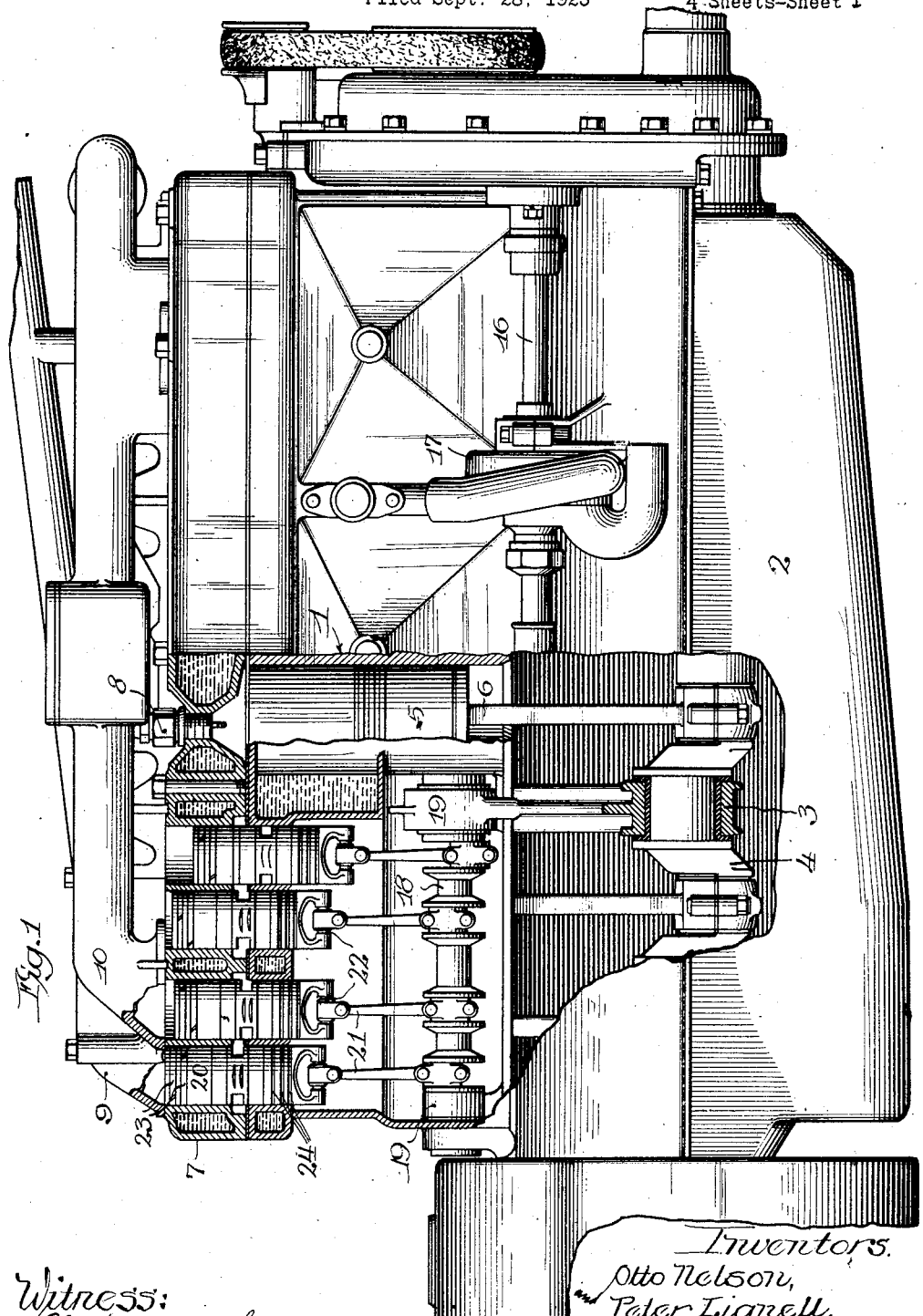

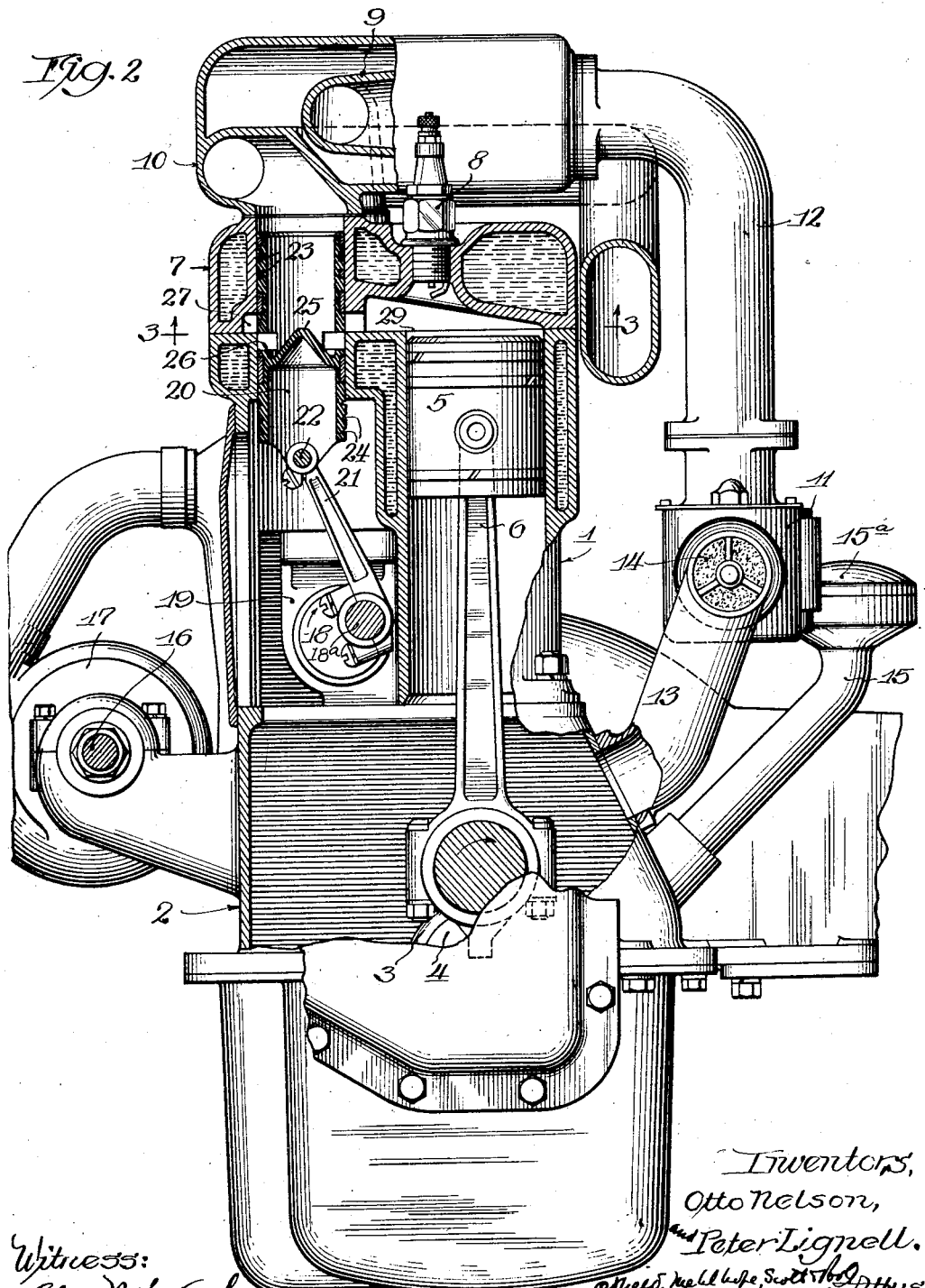

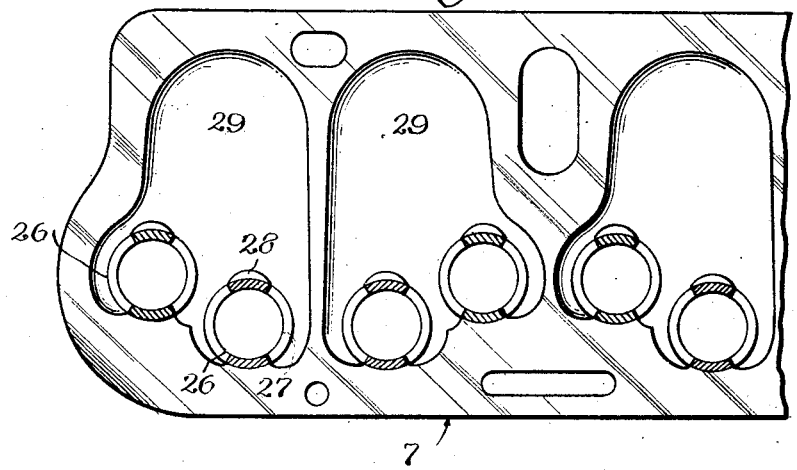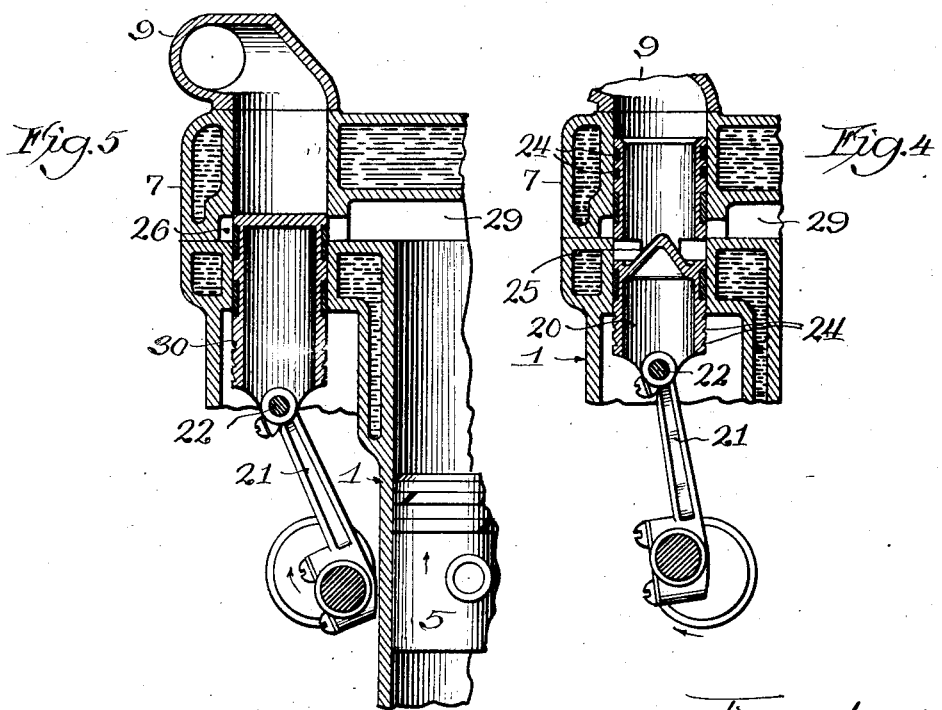

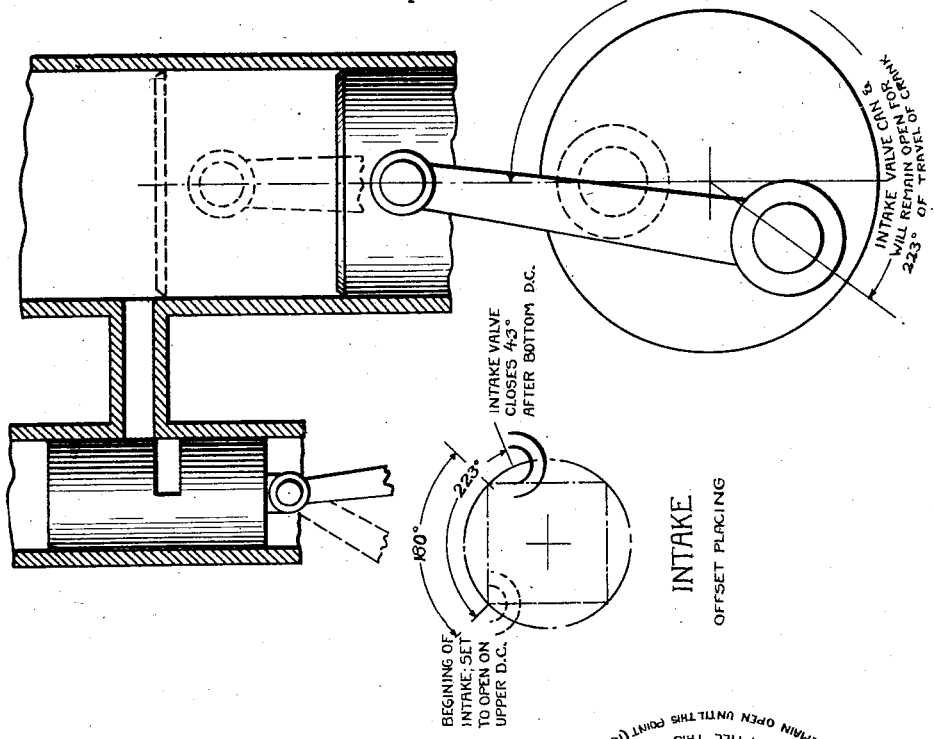
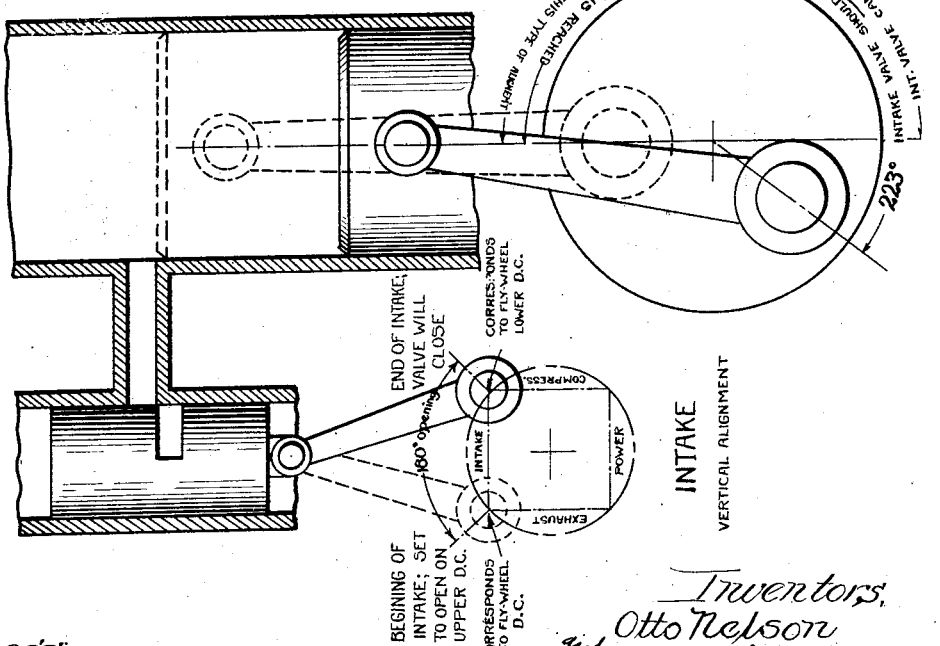

1,640,958

UNITED STATES PATENT OFFICE.

OTTO NELSON AND PETER LIGNELL, OF CHICAGO, ILLINOIS, ASSIGNORS TO HERCULES MOTOR CORPORATION, OF CHICAGO, ILLINOIS, A CORPORATION OF ILLINOIS.

INTERNAL-COMBUSTION ENGINE.

Application filed September 28, 1925. Serial No. 58,960.

This invention relates to improvements in internal combustion engines, and more particularly to a multicylinder four cycle engine of the piston valve type in which the inlet and exhaust ports to each cylinder are controlled by reciprocating piston valves, such as disclosed in United States Letters Patent No. 1,461,494, granted to Nelson on July 10, 1923.

The object of the invention is to provide a practical and workmanlike design for a motor of the type hereinbefore described, designed more especially for automobiles, and characterized by high speed, ample power and flexibility.

A further object of the invention is to provide a motor embodying certain mechanical improvements, calculated to afford increased efficiency, more perfect balance of the moving parts, and more certain timing of the valves.

A further object of the invention is to provide an improved construction and design for the piston valves with a particular view of overcoming difficulties in lubrication which ordinarily exist in motors of the piston or sleeve valve type.

As a preferred embodiment of the invention we have disclosed in the accompanying drawing, a typical automobile motor, in which Figure 1 is a general view in side elevation of the motor with parts broken away to show the cylinder and valve mechanism.

Figure 2 is an enlarged view in front elevation with portions broken away to show one of the cylinders and its associated exhaust valves in elevation.

Figure 3 is a detail view in horizontal section through the cylinder head as taken on line 3—3 of Figure 2.

Figure 4 is a detail view of the exhaust valve shown in Figure 2 in the position immediately prior to the opening of the exhaust port.

Figure 5 is a detail view showing a modified form of piston valve.

Figure 6 is a diagrammatic view of a cylinder and piston valve showing the different positions of the valve with reference to the angular positions of the piston as occurs when the valve crank shaft is in vertical alignment with the valve; and Figure 7 is a diagrammatic view similar to Figure 6, and showing the effect of offsetting the valve crank shaft out of vertical alignment with the axis of the valve.

In its general construction and design, the motor follows the standard practice, hence a brief description will serve to identify the essential parts.

The motor illustrated is a six cylinder design, although the number of cylinders and their arrangement may be varied. In this instance, the cylinders are in line and vertical, being formed in a single cylinder block 1 which also houses a portion of the valve mechanism which will later be treated separately. Below the cylinder block 1 is the crank case 2 with its main crank shaft bearings 3 supporting the crank shaft 4. The piston rod 5 of the power cylinders is driven from the main crank shaft by the usual connecting rods 6.

The upper portion of the cylinder block or cylinder head 7 is parted on a horizontal plane passing through the top of the cylinders, both cylinder block and cylinder head being water jacketed. The spark plugs 8 are mounted in the cylinder head above the several cylinders.

Above the cylinder head 7 and bolted thereto is the inlet manifold 9 and exhaust manifold 10, the two being cast as a single unit, with the inlet manifold enclosed within the exhaust manifold for the purpose of utilizing the heat from the exhaust gases for preheating the mixture drawn into the cylinder from the carburetor 11, located on the right side (Figure 2) of the motor and connected with the inlet manifold by a pipe 12. The carburetor may be of any approved design, differing, however, in one respect from the more common practice in automobile motor design, in that the air supply to the carburetor is drawn chiefly from the crank case through a pipe 13, opening into the case near its top and adjacent the carburetor. The purpose of this arrangement is to utilize the oil-laden air in the crank case for lubricating the valve cylinders, as will again be referred to. In order to augment the air supply from the crank case, a suction valve 14 is mounted in the supply pipe 13 at the carburetor, this being a valve of the spring-actuated-plunger type which opens automatically to draw in the air from the atmosphere in such volume as required. The crank case also has the usual breather pipe 15 and breather head 15a.

At the opposite side of the motor is a countershaft 16 driven from the front end of the crank shaft by gears or silent chain. This countershaft drives the water pump 17 of the cooling system as well as the distributor of the ignition system, the generator for the battery (not shown).

Considering now the valve mechanism, reference has already been made to general types of valves used, which may be described as piston valves or in their preferred form, a combined piston and sleeve valve. Each cylinder is provided with an inlet and exhaust valve and since each cylinder performs as a unit, and differs only from the others in the sequence of power impulse, a single cylinder with its valves will be described. The valves are all driven from a single auxiliary crank shaft 18 extending alongside of the main cylinders near their lower ends and directly below the valves, although the exact location of the shaft with respect to the vertical axis of the pistons is definitely established for important reasons hereinafter to be set forth.

The valve crank shaft 18 is journalled in bearings 19, after the manner of the main crank shaft, and is driven therefrom by gears (not shown) having a gear ratio of one to two, so that the valve crank shaft makes one revolution to every two revolutions of the crank shaft. In other words, the piston valves make one stroke for each two strokes of the main or power pistons. This is common in motor design, as the same gear ratio is used for driving the cam shaft in poppet valve motors.

As clearly shown in Figure 2, the piston valve 20 which is one of the exhaust valves, is a hollow cylindric sleeve sliding in a vertical bore or cylinder, opening at its lower end into the valve crank housing at one side of the main cylinders. The lower half of the valve cylinder is formed in the cylinder block Fig. 2 No. 6 and the upper half in the cylinder head 7, its upper end opening directly into the exhaust manifold 10. It will also be noted that the valve crank shaft is offset inwardly and to one side of the vertical axis of the piston valve, that is to say, the axis of the crank shaft is out of vertical alignment with the piston. Journalled on the crank pin 18ª of the shaft 18 is a connecting rod 21 journalled on a wrist pin 22 extending diametrically of the lower end of the piston.

The amount of lateral offset of the crank shaft is determined for each size or type of motor and is governed by other factors such as the throw of the crank, the length of the connecting rod and location of the ports, all of these contributing to give the desired motion to the valve.

In this connection it is to be pointed out that the offset or rather the results attending the offsetting of the crank shaft may be attained in different ways. For instance, the piston and crank shaft may be in vertical alignment and the connecting rod journalled to the piston at its periphery as disclosed in said Nelson patent. Moreover, the exhaust and inlet valves may be offset on opposite sides of the crank shaft and in different degrees. For convenience, we have disclosed a design in which the exhaust and inlet valves are located at the same distance on opposite sides of the crank shaft, so that they are staggered as clearly shown in Figure 3.

Referring now to the pistons, each is slightly longer than its cylinder, and is provided with an adequate number of piston rings 23 throughout its length. Near its lower end are a series of oil grooves 24 so arranged as to carry the oil upwardly along the cylinder walls as it works its way downwardly by the combined effect of the reciprocating motion and gravity.

Intermediate the ends of the valve is a conical shaped wall or head 25 pointing upwardly and dividing the space above from that below. The lower portion of the valve may be thus considered as a piston having a conical head and the upper portion as a skirt or extended sleeve. In the wall of the sleeve just above the conical head are the ports 26 extending in two diametrically opposed arcs somewhat less than a semi-circle with solid sections between their ends. As clearly shown in Figures 2 and 3, these ports when in register, communicate with annular spaces 27 which practically surround the valves except for short bridge walls 28 which correspond to the solid sections in between the valve ports. These annular spaces form a continuation of the clearance space 29 extending laterally over the top of each power cylinder. Thus considering the exhaust valve shown in Figure 2, it is obvious that when the ports are in register, communication is established between the cylinder and the exhaust manifold 10 through the upper or skirt portion of the valve, the opening extending substantially around the periphery of the valve so that the gases enter the valves from both sides and substantially throughout its periphery. This is an important feature since it brings about a counterbalancing effect of the gas pressures upon the valves, thus tending to reduce the friction between the valve and the valve cylinder. Thus with the opening of the ports, the exhaust gases strike the conical surface of the piston head 25, and are deflected in an upward axial direction toward the outlet to the exhaust manifold.

It is observed, therefore, that during the period of the exhaust port opening, the skirt portion of the valve forms a protective sleeve or passage extending from the port to the manifold, thus preventing the burned gases from coming into contact with the walls of the piston cylinder and destroying the film of lubricating oil on which the non-frictional movement of the valve depends. In this connection it is to be observed that the lower end of the valve crank shaft and connecting rod housing is open to the crank case, whereby the oil is splashed up into the housing for lubricating the bearings, as well as the piston valves, the latter collecting the oil in the annular grooves 24 around its base, and carrying it upwardly, distributes it throughout the cylinder walls. In the matter of valve lubrication, however, an external supply in the form of oil cups may be utilized if desired, and force feed to the crank shaft and connecting rod bearings may be employed.

The same method of lubrication is utilized for the inlet valves and the same advantages of the valve design obtained, the difference being that the explosive mixture is drawn through the ports into the cylinder at or about the commencement of the suction stroke. Again, the valve skirt forms a passage from the inlet manifold to the ports, and similarly protects the cylinder wall against the destructive effect on the oil film of the incoming mixture, which tends to dilute and remove the lubricant. To aid in the lubrication of the inlet valves is the purpose of drawing the oil-laden air of the crank case into the carburetor and thence into the cylinders, it being manifest that such quantities of oil as are thus carried to the cylinders accumulates on the inner wall of the valve skirt and find their way to the surface of the valve cylinders through the valve ports 26.

Referring now to the valve action, it may be first set forth briefly, the sequence of the several events which constitute a complete cycle of an internal combustion motor of the four cycle type. Considering the cycle as commencing with the engine piston at its top dead center position, the succeeding downward stroke is the suction stroke, during which the inlet valve opens and the explosive charge is drawn in. The next upward stroke is the compression stroke during which the charge is compressed, the inlet valve closing at the end of the suction stroke. Prior to the completion of the compression stroke, ignition takes place and the charge is expanded driving the piston downwardly and delivering the power impulse to the flywheel. Immediately following the power stroke the exhaust valve opens and the burned gases are scavenged from the cylinder by the final upward stroke whereupon the cycle is repeated.

Although this cycle of events is approximated in all four cycle engines, their proper and efficient performance is dependent in a large degree on the timing of the valve. In the theoretic cycle, for instance, the inlet valve is assumed to open at the top dead center and close at bottom dead center. In practice, however, the inlet valve should be set to open a few degrees after top dead center thus allowing a patial vacuum to be created in the cylinder so that when the valve opens the charge will be drawn into the cylinder by suction, thereby overcoming the inertia of the gas and tending to completely fill the cylinder in a shorter interval of time. For a similar reason, the inlet valve should close a few degrees after bottom dead center thus permitting the inertia of the entering charge to completely fill the cylinder. Likewise the exhaust valve should open in advance of bottom dead center at the end of the power stroke and remain open after the beginning of the inlet stroke so that the exhaust gases will start to escape before the actual commencement of the exhaust stroke, thereby insuring a more thorough scavenging of the cylinder. Thus it will be seen that the timing of the valves in practical motor design is in a large measure responsible for high efficiency and particularly in high speed motors, where the events occur in such short intervals of time that provision must be made for moving the volumes of gases against their inherent inertia as well as the resistance offered by passages and ports through which they are conducted to and from the cylinders.

The reason for offsetting the axis of the valve crank shaft from the plane of the vertical axis of the piston valves, is to secure a relatively greater time interval of port opening which is essential to proper performance of a high speed automobile motor. This advantage can be readily explained with the aid of the diagrams in Figures 6 and 7 which represent a conventional engine cylinder and piston valve controlling a port to the cylinder. Both engine and valve pistons are driven through connecting rods and cranks, the paths of the crank pins being represented by circles; the diameter of the engine piston circle being twice that of the valve piston circle. Moreover, the valve crank pin circle is divided into equal quadrants representing the four events of the engine cycle. Bearing in mind, however, that the valve crank pin makes a half revolution (180 degrees) or one stroke during a complete revolution (360 degrees) or two strokes of the engine piston the relative angular movement of the valve is one-half that of the engine crank pin.

Considering first the arrangement shown in Figure 6, in which the axis of the valve crank shaft is in vertical alignment with the valve, and designating the valve as the inlet valve, the engine piston is shown in dotted lines at top dead center and at the commencement of the inlet stroke. The piston valve is shown in the position it occupies both at the instant of opening as well as at closing, with the connecting rod in dotted lines in the position corresponding to the dotted line position of the engine piston. Thus during the inlet stroke of the engine piston the valve opens, remains open and then closes, the crank pin having travelled through 90° (to the full line position) in the 180° travel of the engine crank pin from top to bottom dead center position. During the next three strokes, the inlet valve remains closed and again opens at the beginning of the next inlet stroke.

Considering then the chord subtended by the arc representing the movement of the valve during its up and down strokes, a line drawn at right angles to the chord and coinciding with the axis, represents graphically the travel of the valve. Moreover, this line bisects the arc, thus showing that the travel of the valve is the same during both strokes, and that if the valve opens on top dead center it must necessarily close on bottom dead center. Similarly, if the valve is set to open a certain number of degrees in advance of top dead center of the engine piston, the valve will close at the same number of degrees after bottom dead center since the chord subtended by the arc representing the travel of the valve is always at right angles to the axis of the valve, so that regardless of the setting of the valve or length of connecting rod, the valve opens and closes the same number of degrees on either side of top or bottom dead center position when the axis of the crank shaft is in alignment with the valves.

But bearing in mind that efficient performance requires that the inlet valve should open slightly after top dead center and close at a greater angle after bottom dead center, it follows that it is impossible to obtain this timing where the axis of the valve crank is in alignment with the piston, since the valve would close before bottom dead center instead of after.

Referring now to Figure 7, it will be noted that the inlet valve has been set as before to open on the top dead center of the engine piston, but due to the angularity of the connecting rod resulting from the offsetting of the valve crank shaft, the valve crank pin describes a greater arc during the travel of the valve from open to closed positions which arc corresponds to the travel of the engine crank pin during the same interval of 223 degrees or 43 degrees beyond the bottom dead center. Thus when the engine piston reaches lower dead center, the inlet valve is still open and does not close until the engine piston has begun its compression stroke and its crank pin has reached a point on the crank circle 43 degrees beyond lower dead center or 223 degrees beyond top dead center. Now if the inlet valve be set to open after top dead center, it follows that by the offset arrangement the closing can be timed to take place after bottom dead center, in accordance with the practical cycle.

In this way the timing for any design of motor can be determined but the essential point to be emphasized is the fact that only by the offsetting of the valve crank shaft is it possible to have the valve open and close other than at equal intervals before or after dead center positions of the engine piston. Thus having determined on the proper timing of the valves, it can be readily established by graphic methods, the exact amount of offset, length of connecting rod, valve travel and size of port openings required.

In Figure 5 we have disclosed a modified type of piston valve which may be used, but lacking perhaps the advantageous mechanical features of the preferred type of valve. This valve 30 is of the plain piston type which opens the port on its downward stroke and closes the port on its upward stroke, which is exactly the reverse of the preferred form as shown in Figure 4. Otherwise, the valve action is quite the same.

Obviously the construction and design of a motor and its valve mechanism may be modified in other respects without departing from the spirit of the invention, and therefore we do not wish to be limited except in so far as set forth in the appended claims.

We claim as our invention:

1. In an internal combustion engine, the combination of a cylinder, a piston in said cylinder, inlet and exhaust valve cylinders connected with said first mentioned cylinder through ports, piston valves in said valve cylinders, a valve crank shaft, and connecting rods operatively connecting said crank shaft with said pistons, said crank shaft being offset laterally from the axis of at least one of said valve cylinders.

2. In an internal combustion engine, the combination of an engine cylinder, a piston in said cylinder, inlet and exhaust cylinders communicating with said engine cylinder through ports, cylinder valve members mounted in said valve cylinders and acting to open and close said ports, a valve crank shaft, connecting rods connecting said crank shaft with said valve members, said valve cylinders being offset laterally at predetermined different distances from the axis of said crank shaft.

3. In an internal combustion motor, the combination of a cylinder, a piston in said cylinder, inlet and exhaust valve cylinders having ports communicating with said cylinder, reciprocating valve members mounted in said cylinders and adapted to open and close said ports, a valve crank shaft, connecting rods connecting said valve members with said crank shaft, said valve cylinders being offset with respect to the axis of said crank shaft and at predetermined distances on opposite sides thereof.

4. In an internal combustion engine, the combination of a plurality of cylinders, pistons in said cylinders, a main crank shaft operatively connected with said pistons, inlet and exhaust valves for each cylinder comprising vertical valve cylinders, inlet and exhaust manifolds connected with the upper ends of said cylinders, piston valves mounted in said cylinders and adapted to open and close inlet and exhaust ports, a valve crank shaft driven from said main crank shaft, connecting rods connecting said valve shaft with the lower ends of said piston valves, said valve cylinders being arranged in staggered relation with respect to the axis of said valve crank shaft.

5. In an internal combustion engine, the combination of a plurality of engine cylinders, pistons in said cylinders, a main crank shaft operatively connected with said pistons, inlet and exhaust valves for each cylinder comprising valve cylinders, inlet and exhaust manifolds connected with the upper ends of said cylinders, piston valves mounted in said cylinders and adapted to open and close inlet and exhaust ports, a valve crank shaft driven from said main crank shaft and operatively connected with the lower ends of said piston valves, said valve cylinders being offset on opposite sides of the axis of said valve crank shaft.

6. In an internal combustion engine, the combination of a plurality of cylinders, pistons in said cylinders, a main crank shaft operatively connected with said pistons, inlet and exhaust valves for each cylinder comprising vertical valve cylinders, inlet and exhaust manifolds connected with the upper ends of said cylinders, piston valves mounted in said cylinders and adapted to open and close inlet and exhaust ports, a valve crank shaft driven from said main crank shaft, connecting rods connecting said valve shaft with the lower ends of said piston valves, the inlet and exhaust valve of each cylinder being offset laterally on opposite sides of the axis of said valve crank shaft.

7. In an internal combustion motor, the combination of a cylinder block having engine cylinders therein, and parted therefrom on a horizontal plane passing substantially through the top of the cylinders, pairs of inlet and exhaust cylinders formed in said cylinder block and extending vertically along one side thereof, each pair of valve cylinders communicating with one of said engine cylinders through ports, reciprocating cylindric valve members mounted in said valve cylinders, a valve crank shaft extending lengthwise of said cylinder block below said valve cylinders, each pair of inlet and exhaust cylinders having their axes offset laterally on opposite sides of the axis of said crank shaft.

8. In an internal combustion motor, the combination of a cylinder block, pairs of inlet and exhaust valve cylinders formed on one side of said cylinder block with the cylinders of each pair offset at different distances from a predetermined line extending lengthwise of said motor, reciprocating valve members in said valve cylinders comprising a sleeve extending substantially the length of said cylinders and having a conical head intermediate its ends extending toward the open end of said sleeve, a plurality of ports arranged circumferentially about said sleeve substantially opposite said head and adapted to register with ports in said valve cylinders and communicating with said main cylinders, a valve crank shaft, connecting rods connecting said crank shaft with the lower ends of said valve members and in alignment with the axes thereof.

9. In an internal combustion engine, the combination of a plurality of cylinders, pistons in said cylinders, a main crank shaft operatively connected with said pistons, inlet and exhaust valves for each cylinder comprising vertical valve cylinders, inlet and exhaust manifolds connected with the upper ends of said cylinders, valves mounted in said cylinders and comprising a sleeve extending the full length of said cylinders and provided with a head intermediate its ends, and ports surrounding said sleeve above said head and adapted to register with ports in said valve cylinders connected with said engine cylinders, a valve crank shaft driven from said main crank shaft, connecting rods connecting said crank shaft with wrist pins extending diametrically of the lower end of said sleeves, the inlet and exhaust valve cylinders of each engine cylinder being located in staggered relation with respect to the axis of said valve crank shaft.

Signed at Chicago, Illinois, this 18th day of September, 1925.

OTTO NELSON.
PETER LIGNELL.